United States Patent [19]

Taslim et al.

[11] Patent Number: 5,013,340
[45] Date of Patent: May 7, 1991

[54] ROTATING DIESEL PARTICULATE TRAP

[75] Inventors: Mohammad E. Taslim, Needham; Yiannis A. Levendis, Boston, both of Mass.

[73] Assignee: Northeastern University, Boston, Mass.

[21] Appl. No.: 374,078

[22] Filed: Jun. 29, 1989

[51] Int. Cl.$^5$ .............................................. B01D 46/38
[52] U.S. Cl. ....................................... 55/290; 55/302; 55/429; 55/523; 55/DIG. 30; 60/311
[58] Field of Search ................... 55/285, 290, 390, 401, 55/404, 429, 474, 523, DIG. 30, 302; 60/311

[56] References Cited

U.S. PATENT DOCUMENTS

| | | | |
|---|---|---|---|
| 3,176,446 | 4/1965 | Siggelin | 55/390 X |
| 3,668,842 | 6/1972 | Batson et al. | 55/417 |
| 3,908,367 | 9/1975 | Bauman | 55/290 |
| 4,573,317 | 3/1986 | Ludecke | 55/DIG. 30 X |
| 4,715,872 | 12/1987 | Snyder | 55/429 X |

FOREIGN PATENT DOCUMENTS 8412  1/1985  Japan ...................................... 60/311

Primary Examiner—Bernard Nozick
Attorney, Agent, or Firm—Weingarten, Schurgin, Gagnebin & Hayes

[57] ABSTRACT

A rotating particulate trap is disclosed, which may find application in diesel engines, air conditioning systems, industrial air-filters and the like. The invention includes a disk or cylinder which is formed from material suitable for filtering particulates which are present in the exhaust gases of diesel engines, gas turbines, industrial air or other particulate laden gases. The disk is mounted transversely in the exhaust duct of a diesel engine and in a fresh air duct which is disposed parallel to the exhaust duct. As the disk rotates within the exhaust duct, it filters particulates from the exhaust gases of the diesel engine. The filtered particulates are expelled from the disk by fresh air blowing in the air duct as the disk rotates within the air duct. The fresh air is blown in the air duct in a direction opposite to the flow of exhaust gases within the exhaust duct by a fan or compressor or compressed air jets. The counterflow arrangement of fresh air and combustion gases enhances the effectiveness of particulate removal as the disk rotates between the exhaust duct and the fresh air duct. Particulates expelled from the disk are blown into a filter bag which is attached to the end of the fresh air duct.

10 Claims, 1 Drawing Sheet

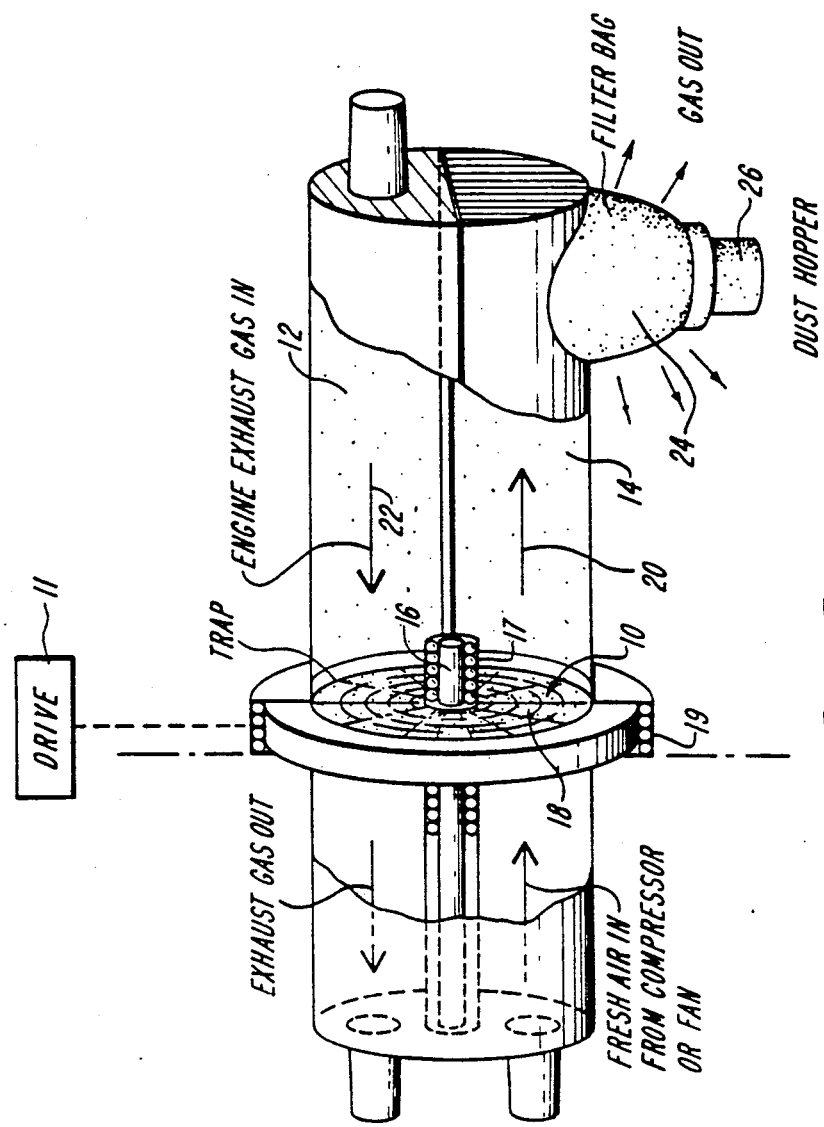
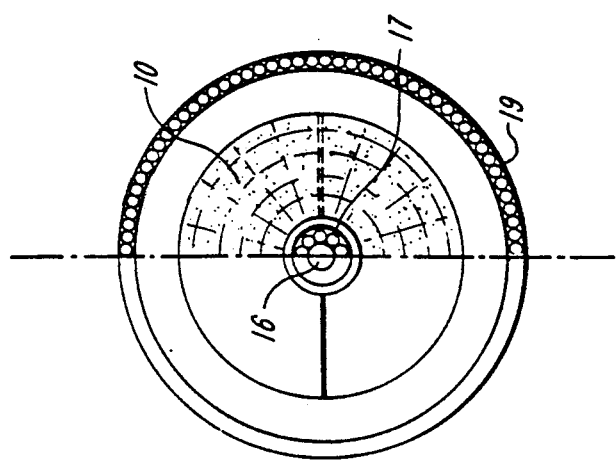

ROTATING DIESEL PARTICULATE TRAP

FIELD OF THE INVENTION

This invention relates to a system for filtering streams of solid particle laden gases and more particularly to a rotating particulate trap for filtering exhaust gases generated by diesel engines.

BACKGROUND OF THE INVENTION

It is well known that combustion in diesel engines results in emissions which pollute the air. These emissions include particulates such as soot. In 1991, new government standards which require that particulate emissions from diesel engines be substantially reduced will come into effect. Present efforts to reduce emissions from diesel engines include re-designing engines and modifying combustion processes to decrease formation of polluting particulates. However, these modifications alone still cannot reduce particulate emissions to the 1991 required limits without the use of exhaust treatment systems.

Present exhaust treatment systems employ various types of filtering elements inserted in the exhaust pipeline. Under normal driving conditions, however, the exhaust gas backpressure increases due to the accumulation of the particulate matter in the filtering element. As a result of this increased backpressure, fuel consumption increases and drivablility deteriorates. Present solutions to this problem include complicated systems for regenerating the filter element by burning the particulates off of the filtering element. Such regeneration requires the use of high temperatures which ultimately cause the filtering element to deteriorate from melting and cracking.

SUMMARY OF THE INVENTION

The present invention provides an exhaust filtering system which does not require regeneration. Instead, particulates which accumulate in the filter from the exhaust gases are continously removed and collected in a disposable fabric filter bag. The present invention also provides an exhaust filtering system which does not cause substantial increase in exhaust back pressure. The present invention further provides an exhaust filtering system which is not complex and is easy to manufacture and operate.

An exemplary embodiment of the present invention includes a fresh air duct mounted parallel and adjacent to an exhaust duct of a diesel engine. A disk or rotatable filter element formed from materials such as a porous ceramic monolith or ceramic fibers is mounted for rotation in a manner which transverses both the exhaust duct of a diesel engine and the fresh air duct mounted parallel and adjacent to the exhaust duct. Particulates which are filtered from the exhaust duct are collected in the disk as the disk rotates within the exhaust pipe.

Particulates are expelled from the disk by fresh air blowing in the air duct as the disk rotates within the air duct. Air fluid flow is provided in the air duct by either a fan or compressed air jets. The air is preferably blown in a direction which is opposite to the flow of the exhaust gases from the diesel engine to facilitate expulsion of collected particulates from the disk. This counterflow arrangement of fresh air and combustion gases enhances the effectiveness of particulate removal from the disk as it rotates within the fresh air duct.

The particulates which are expelled from the disk are blown into a disposable or other filter bag which is attached to the end of the fresh air duct. The weave of the bag entraps the particulates but allows air to escape, thereby preventing any backpressure in the exhaust system or bursting of the bag. The filter bag may be cleaned or changed at regular intervals.

The present invention is especially useful and will be discussed in the specific application to diesel engines; however, the invention is applicable to other engines and systems where particuluates are to be removed from a gas stream.

DESCRIPTION OF THE DRAWING

The invention will be more fully understood from the following detailed description taken in conjunction with the accompanying drawings in which:

FIG. 1 is a diagrammatic view of a filter system embodying the invention; and

FIG. 2 is a plan view of a rotating filter element employed in the system of FIG. 1.

DETAILED DESCRIPTION OF THE INVENTION

The present invention will be described with reference to a system for filtering particulates from the exhaust gases of a diesel engine. Referring to FIG. 1 there is shown a fresh air duct 14 mounted parallel and adjacent to the exhaust duct 12 of a diesel engine. A filter disk 10, which is a filter formed from porous ceramic monolith or ceramic fibers, is mounted transversely to the flow axis of the engine exhaust duct 12 and the fresh air duct 14. The filter disk 10 is mounted for rotation on its axis defined by axle 16. The rotation of the filter disk 10 may be accomplished by a drive 11 such as an small electric motor or a belt connecting the axle 16 to the drive shaft of the engine. The filter, also shown in FIG. 2, includes inner bearings 17 and outer bearing 19 to provide low friction rotation of the filter disk 10.

As the filter disk 10 rotates, each of its sectors 18 rotate first within the exhaust duct 12 and then within the fresh air duct 14. As each of the sectors 18 of the filter disk 10 rotates within the exhaust duct 12, particulates from the exhaust gases flowing within the exhaust duct are entrapped in the filter disk 10. The entrapped particulates are expelled from the filter disk 10 by air fluid flow as the sectors 18 containing the trapped particulates rotate within the air duct 14.

Air fluid flow 20 within the air duct 14 is provided by a fan (not shown) or by a source of compressed air (not shown). The fresh air flows within the air duct 14 in the direction of arrow 20 which is opposite to the direction of the flow 22 of exhaust gases within the exhaust duct 12. The counterflow arrangement of exhaust gases and inlet air fluid flow enhances the effectiveness of particulate removal from the filter disk 10 within the fresh air duct.

Particulates which have been expelled from the filter disk 10 are blown into a filter bag 24 which is removably attached to the end of the fresh air duct 14. The filter is typically made of a fabric the weave of which causes the particulates, which are blown into the bag 24, to be entrapped but allows air to escape the bag 24 in order to prevent a build up of backpressure within the exhaust system and to prevent the bag 24 from bursting. The filter bag 24 can be disposable and may be removed for cleaning or replacement, and may be coupled to a dust hopper 26, The invention is applicable to internal combustion engines, air conditioning devices, air cleaners for buildings, and other apparatus where exhaust gas and counter flow of air can be provided for filter cleaning. The implementation of the system can take a variety of forms to suit specific embodiments and operating environments. Accordingly, the invention is not to be limited by what has been particularly shown and described, except as indicated by the appended claims.

What is claimed is:

1. A rotating diesel engine particulate trap for a diesel engine, the diesel engine coupled to an exhaust duct for expelling hot combustion gases laden with particulates generated by the diesel engine comprising:
   means for coupling the exhaust duct of the diesel engine to the rotating particulate trap;
   means for providing gas flow substantially parallel and adjacent to the combustion gases flowing through the exhaust duct including a duct disposed parallel to the exhaust duct, and wherein said gas flow is counterflow to the combustion gases generated by the diesel engine;
   filter element means for filtering particulates from the combustion gases flowing through the exhaust duct, said filter element means being disposed transversely to the combustion gases flowing through the exhaust duct and to said gas flow and operative for rotational movement with respect thereto;
   means for effecting rotational movement of said filter element means;
   wherein said rotational movement of said filter element means transversely to the combustion gases filters particulates therefrom, and
   wherein said rotational movement of said filter element means transversely to said gas flow causes particulates collected in said filter element means to be expelled therefrom; and
   receptacle means coupled to said gas flow providing means, downstream from said filter element means, for trapping particulates expelled from said filter element means.

2. The rotating diesel engine particulate trap of claim 1 wherein said gas flow providing means includes means for providing air flow to expel particulates from said filter element means.

3. The rotating diesel engine particulate trap of claim 1 wherein said filter element means is formed from porous ceramic monolith.

4. The rotating diesel engine particulate trap of claim 1 wherein said receptacle is a disposable, total filter fabric bag.

5. The rotating diesel engine particulate trap of claim 1 wherein said filter element means is formed from ceramic fibers.

6. The rotating diesel engine particulate trap of claim 5 wherein said means for effecting rotational movement of said filter element means includes coupling means connected to the crankshaft of the diesel engine.

7. A rotating diesel engine particulate trap for a diesel engine, the diesel engine coupled to an exhaust duct for expelling hot, ultrafine, particulate laden combustion gases generated by the diesel engine comprising:
   means for coupling the rotating particulate trap to the exhaust duct of the diesel engine;
   a duct disposed parallel and adjacent to the exhaust duct;
   means for providing gas flow through said duct;
   a filter element mounted for rotational movement within said duct and the exhaust duct transversely to the combustion gases causing particulates to be filtered from the combustion gases;
   means for effecting rotation of said filter element;
   said filter element rotating transversely to said gas flow causing particulates collected in said filter element to be expelled therefrom; and
   a receptacle removably attached to said duct downstream of said filter element to trap particulates expelled from said filter element.

8. The rotating diesel engine particulate trap of claim 7 wherein said receptacle is a disposable, total filter fabric bag.

9. A rotating diesel engine particulate trap for a diesel engine, the diesel engine coupled to an exhaust duct for expelling hot combustion gases laden with particulates generated by the diesel engine comprising:
   means for coupling the exhaust duct of the diesel engine to the rotating particulate trap;
   means for providing gas flow substantially parallel and adjacent to the combustion gases flowing through the exhaust duct;
   filter element means for filtering particulates from the combustion gases flowing through the exhaust duct, wherein said filter element means is formed from ceramic fibers, and said filter element means being disposed transversely to the combustion gases flowing through the exhaust duct and to said gas flow and operative for rotational movement with respect thereto;
   means for effecting rotational movement of said filter element means including coupling means connected to the crankshaft of the diesel engine, wherein said rotational movement of said filter element means transversely to the combustion gases filters particulates therefrom, and wherein said rotational movement of said filter element means transversely to said gas flow causes particulates collected in said filter element means to be expelled therefrom; and
   a receptacle removably attached to said duct downstream of said filter element means to trap particulates expelled from said filter element means.

10. The rotating diesel engine particulate trap of claim 9 wherein said receptacle is a disposable, total filter fabric bag.

* * * * *